Figure 1:
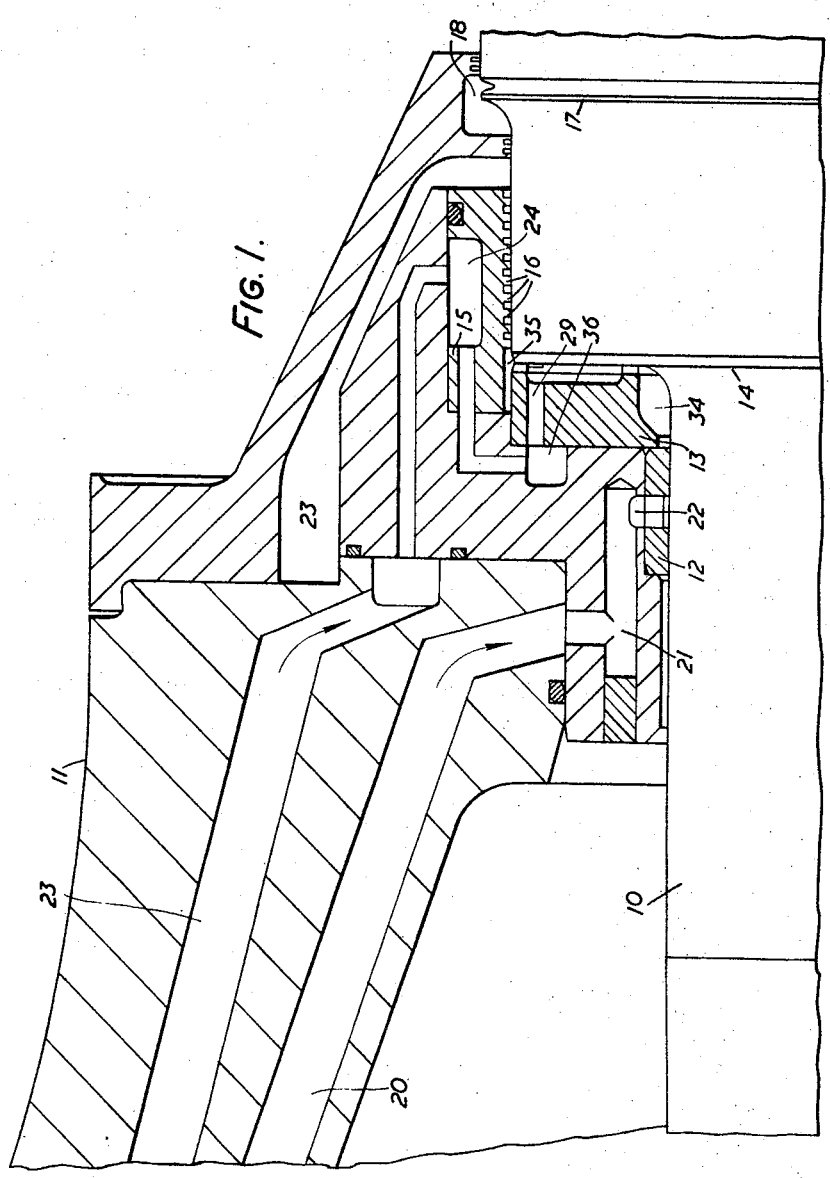

Aug. 30, 1960   R. N. HARROP ET AL   2,950,942
THRUST BEARINGS, FACE SEALS OR THE LIKE
Filed Sept. 2, 1958   2 Sheets-Sheet 1

INVENTORS
RAYMOND N. HARROP
JOHN M. GARDNER
BY
Watson, Cole, Grindle & Watson
ATTORNEY Aug. 30, 1960    R. N. HARROP ET AL    2,950,942
THRUST BEARINGS, FACE SEALS OR THE LIKE
Filed Sept. 2, 1958    2 Sheets-Sheet 2

INVENTORS
RAYMOND N. HARROP
JOHN M. GARDNER
BY
*Watson, Cole, Grindle & Watson*
ATTORNEY 2,950,942

THRUST BEARINGS, FACE SEALS OR THE LIKE

Raymond Neill Harrop, London, and John Maddox Gardner, Sunbury-on-Thames, England, assignors to D. Napier & Son Limited, London, England, a company of Great Britain Filed Sept. 2, 1958, Ser. No. 758,310

Claims priority, application Great Britain Sept. 3, 1957

3 Claims. (Cl. 308—160)

This invention relates to thrust bearings or face seals of the kind comprising a member having an annular face formed with a series of circumferentially spaced pads or steps separated by shallow recesses. Means are provided for supplying a lubricating fluid to the recesses and when the member rotates against a corresponding annular face a lubricating fluid is lifted from these recesses on to the pads by dynamic friction and thus maintains an oil film between the pads and the cooperating face.

The lubricating fluid (hereinafter for convenience referred to as oil) supplied to the recesses need only be at a relatively low pressure and its pressure will be substantially increased as it is carried on to the adjacent raised pads. Furthermore the pressure of the oil at these pads may be raised further due to centrifugal forces, even if the member carrying the pads is itself stationary. Thus the oil will tend to escape from the outer periphery of the pads and if the outer periphery of the member is confined in a chamber the pressure in this chamber will tend to rise in some cases to an undesirable level.

It is an object of the present invention to provide an improved thrust bearing or seal of the kind referred to which will at least partly overcome these disadvantages.

According to the present invention therefore a thrust bearing or face seal of the kind referred to has formed on its annular face a circumferentially extending groove around the outer peripheral edge of each pad, this groove communicating with one of the adjacent recesses. Thus any fluid escaping from the outer edge of a pad enters the groove and the pressure is automatically reduced to the relatively low supply pressure in the recesses.

Preferably each peripheral groove communicates with the next forward adjacent recess, in relation to the direction of movement of the oil due to the relative rotation between the parts.

Moreover the oil is preferably supplied to the recesses at a point spaced from their inner ends (that is to say their ends adjacent the main axis of rotation) and is removed from the inner ends thereof. In such case a metering channel or aperture is preferably provided at the inner end of each recess.

According to a preferred feature of the invention the peripheral grooves on the outer edges of the pads communicate with one another via shallow channels of restricted cross section, thus forming a complete annular groove of varying depth.

The invention is particularly applicable to rotary fluid seals arranged to act also as thrust bearings, for example in association with a rotary fan designed to circulate hydrogen. In such cases it is important that the gases should not be allowed to pass along the shaft past the seal and it is also important that the lubricating oil used in the seal should not escape along the shaft into the fan casing containing the gas. Thus according to another aspect of the invention a rotary fluid seal for a shaft passing through a wall comprises a thrust bearing or face seal as defined above arranged to cooperate with an annular face on the shaft or vice versa, and a sealing member connected to the stationary wall and having an internal surface lying closely adjacent to a corresponding surface on the shaft, the surface of the sealing member being provided with a helical or spiral groove, the direction or pitch of the helix or spiral being such in relation to the direction of rotation of the shaft that fluid tends to be moved through the helical channel towards the main annular sealing surface on rotation of the shaft.

Figure 2:
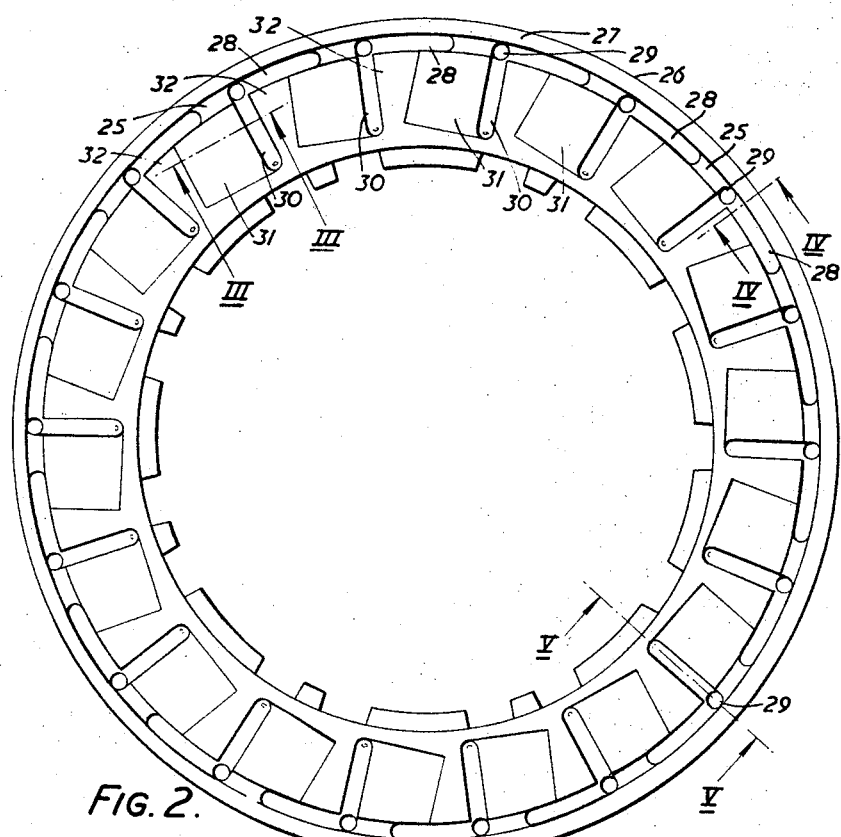
Figure 3:
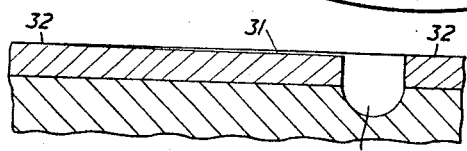
Figure 4:
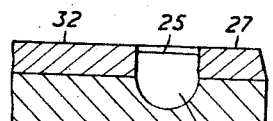
Figure 5:
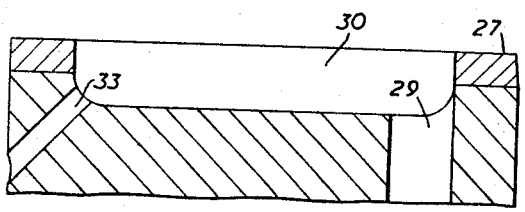

The invention may be performed in various different ways but one specific embodiment will now be described by way of example with reference to the accompanying drawings in which:

Figure 1 is a sectional side elevation of a combined thrust bearing and rotary gas seal for a shaft passing through a casing, Figure 2 is an end view of the annular member 13 included therein, and Figures 3, 4 and 5 are scrap sectional views on the lines III—III, IV—IV and V—V in Figure 2.

In this example the invention is applied to a combined thrust bearing and rotary gas seal for a hydrogen circulating fan. The shaft 10 of the fan passes through a part of the casing 11 of the fan where it is supported by a plain bearing 12. The left hand side of this bearing is exposed to generally atmospheric pressure, the right hand side of the casing where the shaft 10 projects therefrom being exposed to hydrogen gas at relatively higher pressure. This right hand side will be referred to for convenience as the upstream or gas pressure side. Immediately on the upstream side of this plain bearing 12 there is provided a thrust bearing comprising an annular member 13 secured to the casing by bolts (not shown) and having on its upstream side an annular face formed with a series of circumferentially spaced pads separated by shallow recesses, as illustrated in more detail in Figures 2, 3, 4 and 5, the complete annular face being arranged to bear against a corresponding flat annular face 14 on the shaft. The outer periphery of this annular thrust bearing member 13 is enclosed in a chamber formed by a sleeve 15 which is spaced by a small clearance from the outer edge of the thrust bearing member 13 and this sleeve is provided with an internal helical labyrinth seal 16 which engages a cylindrical surface on the shaft. The hand of the helix 16 is so arranged that on rotation of the shaft any fluid within the channel formed by the helix tends to be carried in a downstream direction away from the gas pressure side towards the atmospheric or left hand side of the seal. Immediately on the upstream side of the helical "windback" seal 16 the shaft is provided with an oil thrower ring 17 lying in an annular chamber 18 formed in the wall of the casing and this chamber communicates with a drain passage (not shown).

Lubricating oil under pressure is supplied to the bearing via a drilling 20 in the wall of the casing, and a passage 21 leading to an annular chamber 22 surrounding the bearing 12, the oil being admitted to the bearing surface via drillings in this bearing. Another oil supply passage 23 leads first to an annular chamber 24 formed by a groove in the outer surface of the sleeve 15, which acts as a cooling jacket for the helical "windback" seal 16. From this chamber 24 the oil passes to an annular supply gallery 36 adjacent to the downstream side of the annular thrust bearing member 13.

The thrust bearing member 13 is formed with a series of generally radial grooves 30, each lying adjacent to an inclined ramp 31 leading up to a summit plane or pad 32. The bearing member is also formed with a complete shallow circumferential groove 25 on its upstream side spaced a small distance inwards from its outer peripheral edge 26. The part of the seal 27 outside the groove is flat and lies in close contact with the adjacent co-operating annular face 14 on the shaft. This complete circumferential groove is deepened over a series of spaced arcs 28 each extending from a point adjacent the mid point of one of the ramps 31 measured in a circumferential direction and terminates at the end of the next forward pad 32 measured in the same direction where it communicates with the next radial groove 30 in the floor of the next adjacent recess, the groove 30 being of slightly greater depth than this recess. Thus the deeper peripheral groove sections 28 bound the outer edge of each of the raised pads 32. A series of axial oil supply drillings 29 are provided through the bearing member from the outer end of each radial supply groove to the downstream face of the bearing where they communicate with the oil supply gallery 24. The inner end of each of the radial supply grooves 30 communicates with a metering passage 33 of restricted area which terminates at the inner circumferential face of the bearing and the oil escapes from these metering passages into an annular chamber 34 surrounding the shaft 10 from which chamber it is removed via an oil return passage (not shown) in the wall of the casing.

The interrupted relatively deep arcuate grooves 28 bordering the raised pads 32 allow the relatively high oil pressures that are generated across the ramps 31 to drop to the relatively low oil supply pressure in the grooves 28. Thus the oil pressure in the chamber 35 surrounding the thrust bearing is maintained at the relatively low supply pressure and this pressure can be counterbalanced by the pressure generated in the helical windback labyrinth seal 16 thus avoiding any escape of oil to the high gas pressure side of the complete seal. The depth of the complete shallow annular groove 25 in the thrust bearing is likely to be critical. If the depth is too great oil will tend to swirl or circulate around the groove and this may tend to prevent oil flowing inwards across the bearing which might give rise to overheating.

What we claim as our invention and desire to secure by Letters Patent is:

1. A thrust bearing comprising a member having an annular face formed with a series of circumferentially spaced pads separated by shallow recesses extending in a radial direction and a complete circumferentially extending groove around the outer peripheral edges of each of the pads, this groove communicating with each of the adjacent recesses, and being of varying depth in the circumferential direction, and including means for delivering oil to the recesses at points spaced from their radially inner ends, and means for removing oil from the recesses at points adjacent these inner ends.

2. A thrust bearing as claimed in claim 1 in which the means for removing oil from the recesses comprising a metering channel for each recess.

3. A thrust bearing as claimed in claim 1 in combination with a rotary shaft having an annular face against which the annular face of the member bears, and a helical labyrinth seal surrounding the shaft, the hand of the helix being arranged to urge fluid, on rotation of the shaft, towards the outer periphery of the bearing member.

References Cited in the file of this patent
UNITED STATES PATENTS
2,155,455     Thoma _____ Apr. 25, 1939